(No Model.) 3 Sheets—Sheet 1.

E. DAVIES.
APPARATUS FOR DISINTEGRATING SPENT HOPS.

No. 450,059. Patented Apr. 7, 1891.

Witnesses
Inventor
E. Davies
By
atty (No Model.) 3 Sheets—Sheet 3.

E. DAVIES.
APPARATUS FOR DISINTEGRATING SPENT HOPS.

No. 450,059. Patented Apr. 7, 1891.

Witnesses
Inventor
E. Davies

UNITED STATES PATENT OFFICE.

EDWARD DAVIES, OF LONDON, ASSIGNOR OF ONE-HALF TO HENRY FOARD-HARRIS, OF BROOKE-HOUSE FLEET, ENGLAND.

APPARATUS FOR DISINTEGRATING SPENT HOPS.

SPECIFICATION forming part of Letters Patent No. 450,059, dated April 7, 1891.

Application filed October 26, 1886. Serial No. 217,286. (No model.) Patented in England July 8, 1886, No. 8,936; in Germany October 13, 1886, No. 39,715; in Belgium October 28, 1886, No. 75,027, and in Austria-Hungary September 21, 1887, No. 20,885 and No. 45,035.

*To all whom it may concern:*

Be it known that I, EDWARD DAVIES, a subject of the Queen of Great Britain, residing at London, county of Middlesex, England, have invented new and useful Improvements in Apparatus for Disintegrating Spent Hops for Use in Paper and Card-Board Making, (for which I have obtained Letters Patent in Great Britain, No. 8,936, bearing date July 8, 1886; in Belgium, No. 75,027, bearing date October 28, 1886; in Germany, No. 39,715, bearing date October 13, 1886, and in Austria-Hungary, No. 20,885 and No. 45,035, bearing date September 21, 1887,) of which the following is a specification.

Spent hops as received from breweries after use in brewing and before being treated by this invention are first cleaned by washing to get rid of as much of the "wort" and dirt as adheres to them, and then partially dried, when they are ready to be treated by this apparatus to separate the seeds from the petals and to cut up the latter. These operations are effected by the arrangement of apparatus illustrated in the accompanying drawings, in which—

Figure 1:
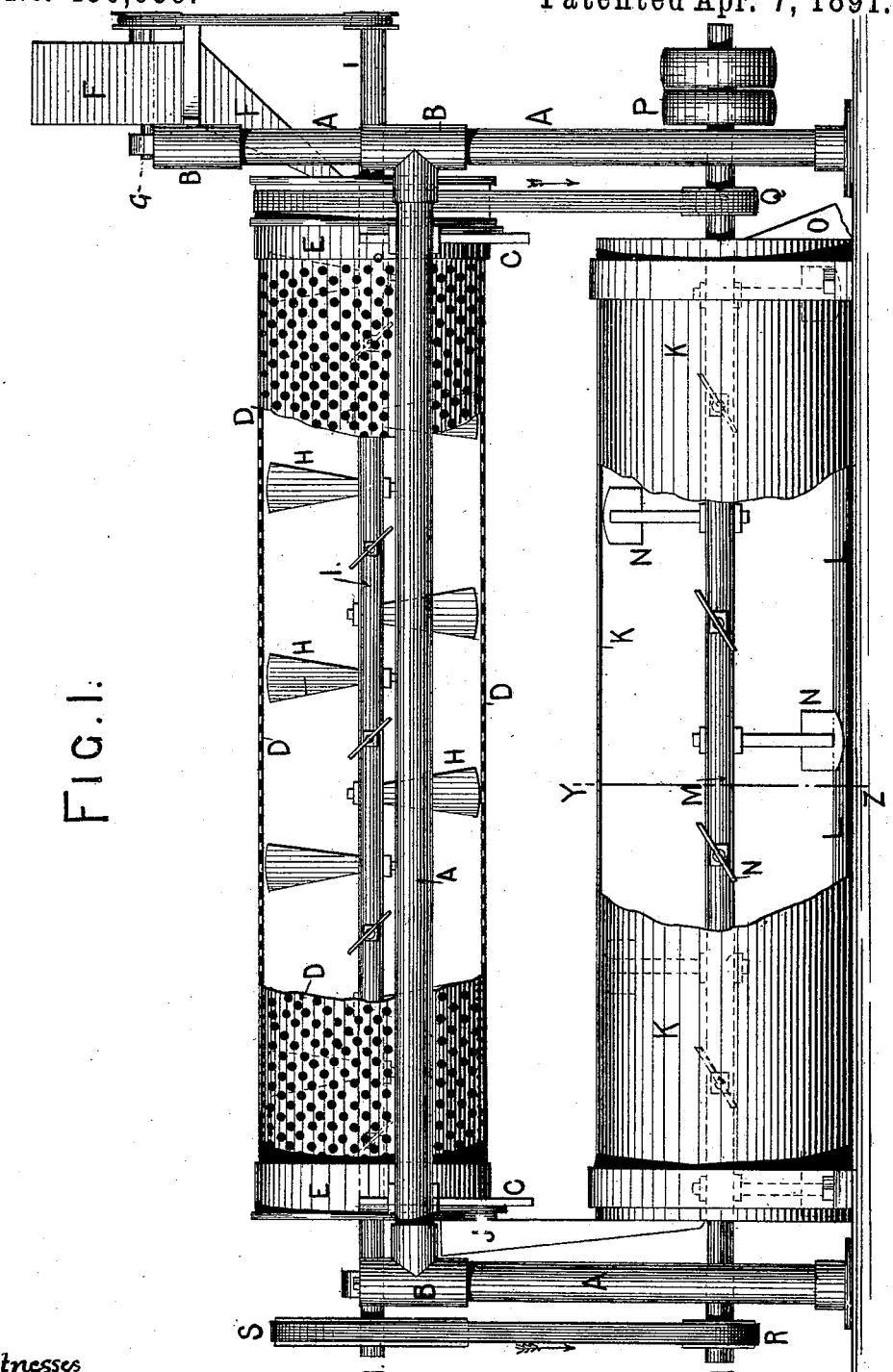
Figure 2:
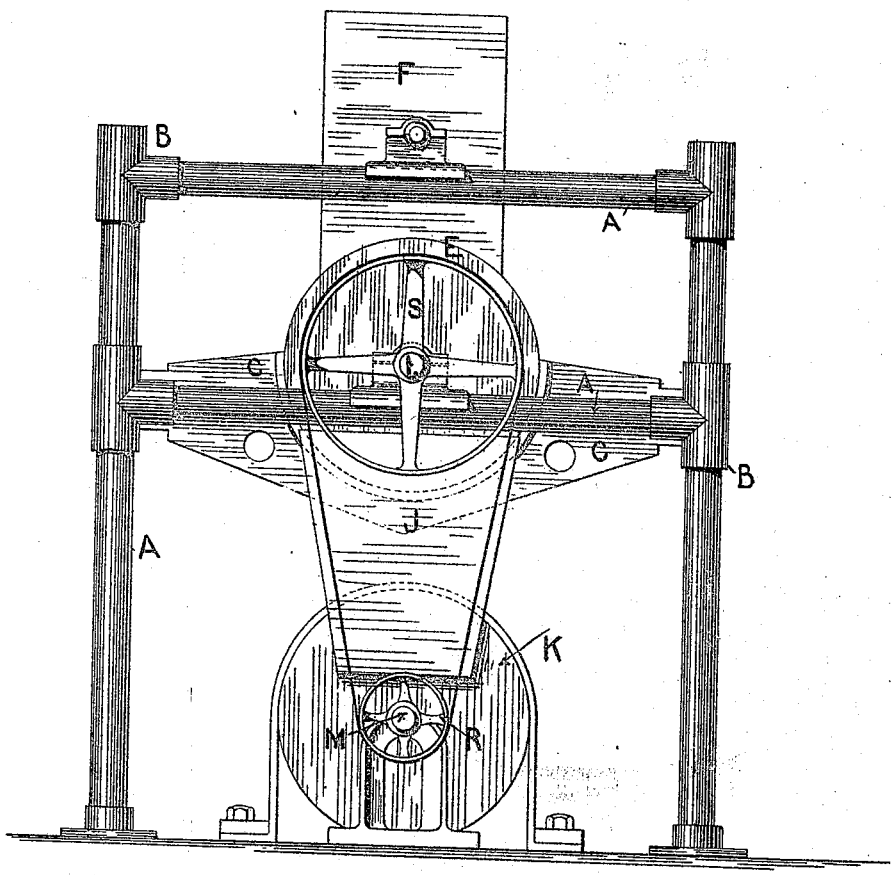
Figure 3:
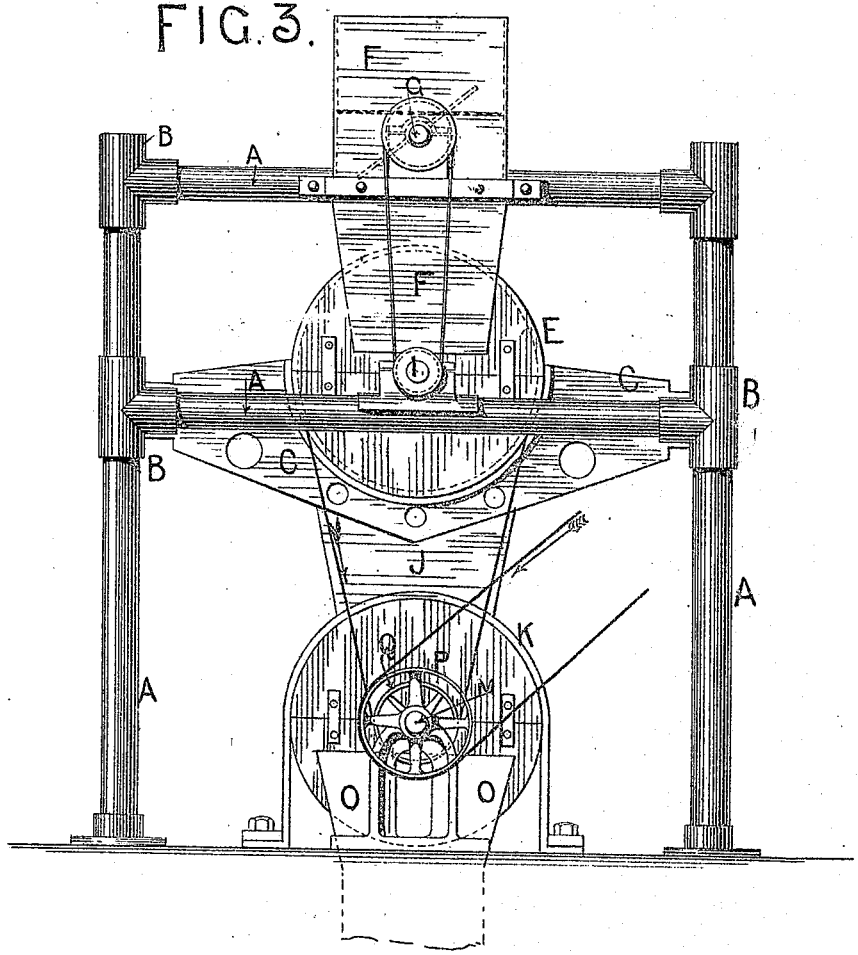
Figure 4:
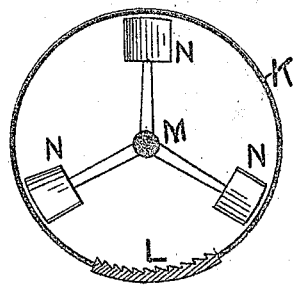

Figure 1 is a side elevation, partly in section; Figs. 2 and 3, end views of same; Fig. 4, an end view of part embodied in Fig. 1 through line Y Z.

A is a frame, which may be made of metal tubes connected by T-pieces B, into which the lengths of tubing screw. The frame A has attached to it suitable saddle-pieces C to support a cylinder D, which may be a fixture, but is preferred to slowly revolve. This cylinder is intended to act as a sieve for sifting out the seeds from the petals, and may be constructed of a perforated metal tube carried between cast-iron cap ends E, the perforations being a suitable size for the seeds only to pass through. Attached to the frame A is a hopper F, communicating with the interior of cylinder at one end into this hopper. The hops are fed and rest upon a grating, through which they are gradually drawn by revolving feeding-blades, and fall into cylinder D. These blades are attached to a cross-spindle G, passing through hopper and under grating and turned by pulleys and band.

The hops are propelled through the cylinder D by means of vanes or beaters H, attached to a revolving shaft I, passing through cylinder longitudinally. These vanes separate and stir up the hop-petals, and by the incline angle at which they (the vanes) are set push them through the cylinder while stirring them up, and so assist the sifting out of the seeds. On passing through the cylinder D the petals fall down a chute J into a tearing-up chamber K. This may consist of a metal tube suitably fixed. In the bottom of this chamber K are secured a number of longitudinal cutters or edges L. Passing through the chamber is a shaft M, arranged to revolve, having attached a number of cutters or tearers N. These may consist of steel blades attached to a short arm screwed into shaft M. The edges of the cutters N are set to come close to the edges of the cutters L. The latter are set in a curve corresponding to the travel of the edges of the revolving cutters N. The blades of these cutters are also set at an incline to propel the material through the chamber as well as tear it up against the bottom fixed cutters. The torn-up hop-petals may then pass down a chute O, from whence the material is collected and is ready to be treated in the usual way for the manufacture of pulp. Any suitable means may be employed to collect the sifted-out seeds.

The machine is driven from the pulley P. The cylinder D is slowly rotated from a small pulley Q on shaft M by strap passing round one of the ends E, arranged for this purpose, and the upper shaft I is revolved from lower shaft M by band and pulleys R S. The ends of the cylinder D and chamber K are closed by suitable lids, which for convenience of removal are made in halves.

Having fully described my invention, what I desire to claim, and secure by Letters Patent, is—

1. An apparatus for the treatment of spent hops, consisting of the frame A, supports C, cylindrical sifter D, horizontally held and having a feeding device at one end and an exit at the other end, and an internal revolving shaft I, fitted with vanes or beaters H, spirally set to work the petals through the sifter, and any convenient tearing-up apparatus suitably arranged to receive the worked-out petals, as described and set forth.

2. The apparatus for the treatment of spent hops, for the purpose described, consisting of a frame A, supports C, cylindrical sifter D, provided with a hopper F, communicating with one end and having a feeding device and an exit at other end, an internal revolving shaft I, fitted with beaters or vanes H, spirally set, chute J, chamber K, fitted with longitudinal bottom fixed cutters L, internal revolving shaft M, fitted with tearers N, and exit O, as described and set forth.

EDWARD DAVIES.

Witnesses:
ARTHUR R. SKERTEN,
17 Gracechurch Street, London, E. C.
CHAS. BERKLEY HARRIS,
Notary Public, London.